Sept. 24, 1946.   E. LABIN ET AL   2,408,079
PULSE DISCRIMINATOR
Filed June 19, 1944   3 Sheets-Sheet 1

INVENTORS
EMILE LABIN
DONALD D. GRIEG
BY
ATTORNEY

Sept. 24, 1946.  E. LABIN ET AL  2,408,079
PULSE DISCRIMINATOR
Filed June 19, 1944  3 Sheets-Sheet 2
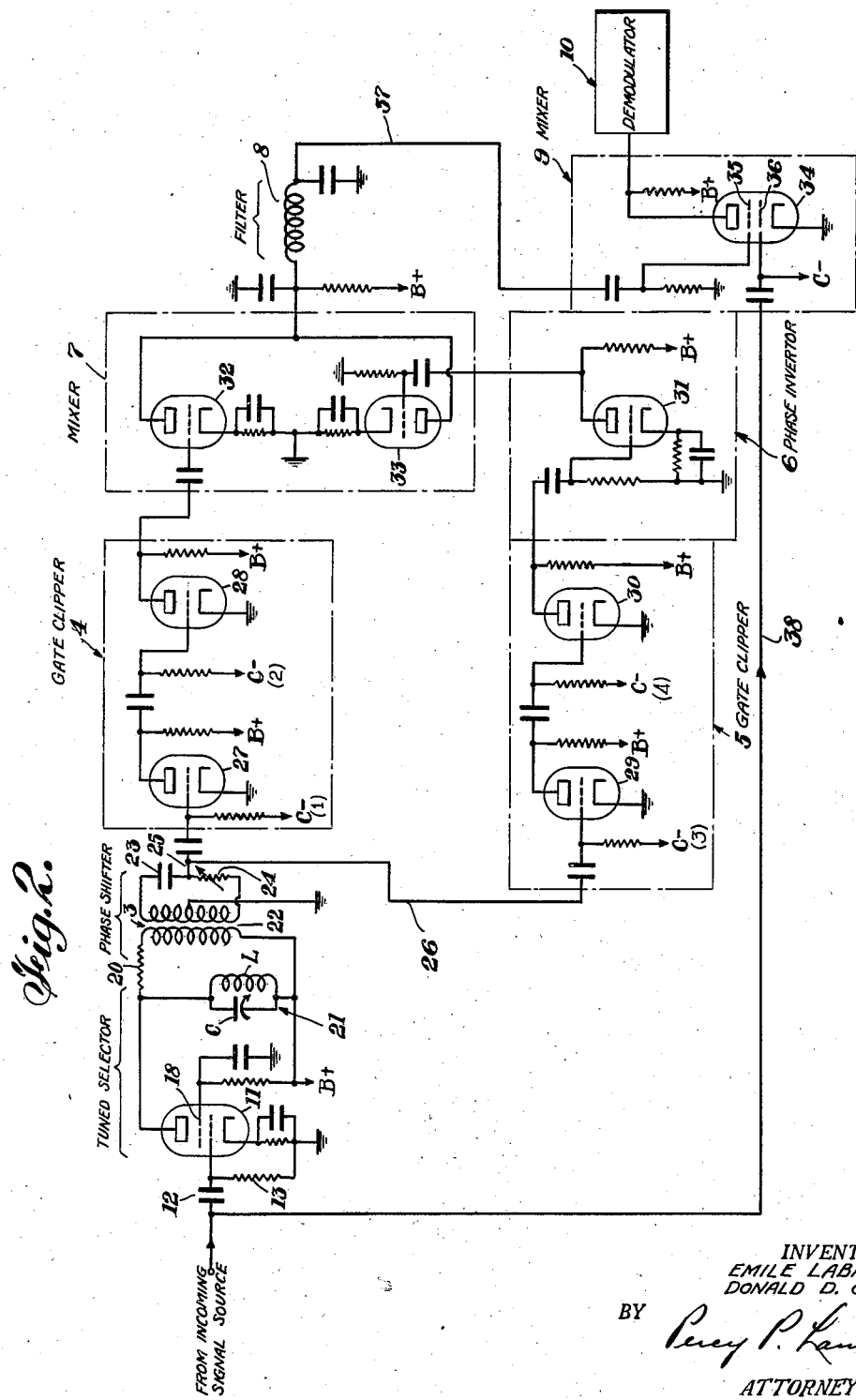

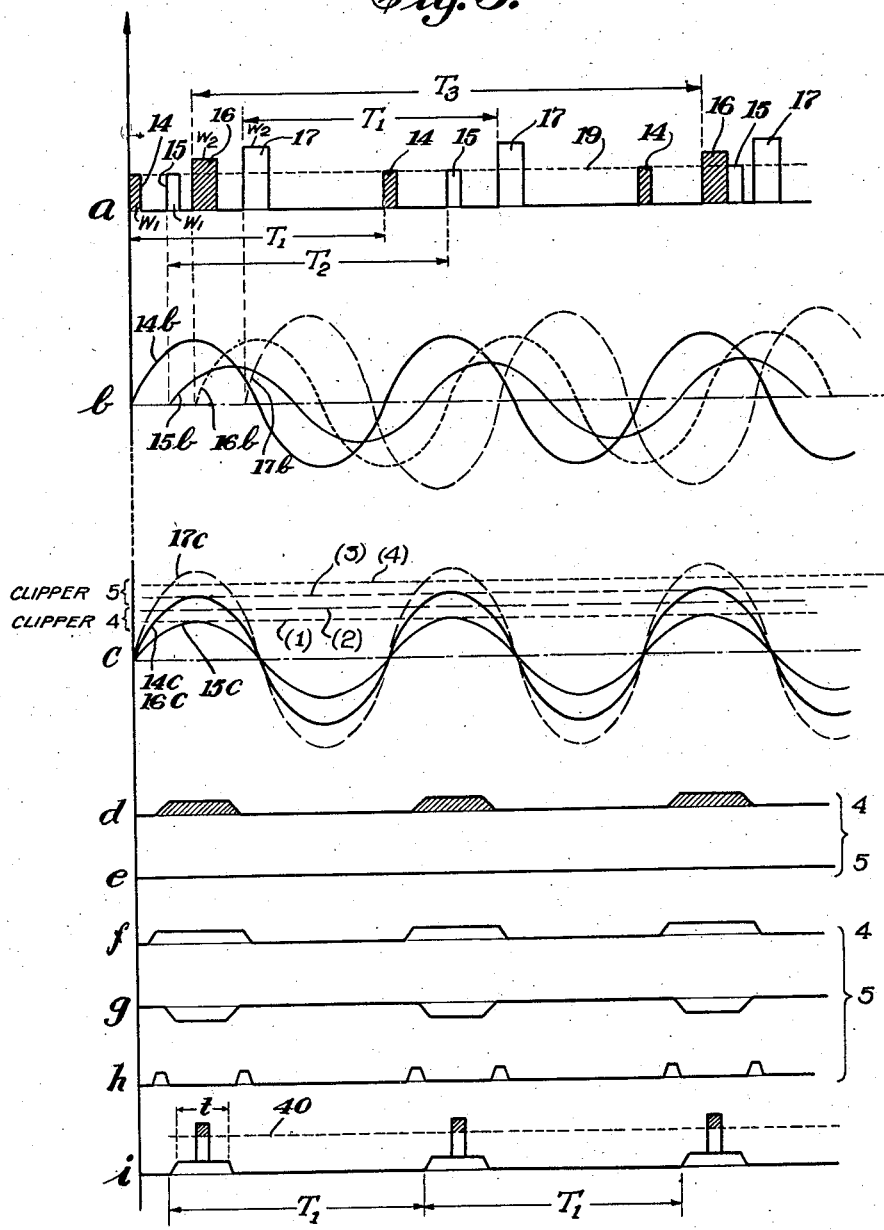

Patented Sept. 24, 1946

2,408,079

UNITED STATES PATENT OFFICE 2,408,079

PULSE DISCRIMINATOR

Emile Labin, New York, and Donald D. Grieg, Forest Hills, N. Y., assignors to Federal Telephone and Radio Corporation Application June 19, 1944, Serial No. 540,998

18 Claims. (Cl. 250—27)

This invention relates to pulse communication receiving systems and more particularly to systems for discriminating incoming pulse signals according to a given ratio between the width and the recurrence rate or frequency of the pulses.

In the case of pulse communication, either telephony or telegraphy, by line transmission or by radio link, interference pulses or pulses of other communicating channels present having characteristics similar to the pulses of a given channel cause interference and jamming for the usual receiver.

The present invention has for an object the provision of a method and means for filtering out from a train of pulses those pulses having a desired ratio of pulse width to pulse frequency.

It is a further object to provide a method and system which is capable of deriving from a train of pulses a deblocking undulation which, when combined with the train of pulses serves to select only those pulses characterized by a desired ratio of pulse width to pulse frequency.

In accordance with our invention there is provided means to first subject the incoming train of pulses, which may include pulses of varying widths and frequencies, to a frequency selector operation which results in a mixed series of sine waves having a given frequency, that is, the frequency that corresponds to the recurrence rate of the desired pulses or where the pulse recurrence rate is a multiple of the given frequency, the amplitudes of which are proportional to the various width-to-frequency ratios represented by the pulses in the train. The resultant sine waves are then applied to a pair of gate clipping circuits, of which one permits the passage of a portion of the sine waves above a given level, thus eliminating all sine waves having an amplitude less than this given level; while the second circuit passes a portion of the sine waves above the first level. The output of the second gate clipper is given a phase shift of 180°, that is, it is inverted and is then combined with the output of the first gate clipper, so that whenever the second clipper is productive of an output pulse, the combined output balances out to substantially zero.

It will be thus apparent that the clipper circuits will pass portions of sine waves only within a given amplitude range, that is, act to select sine waves derived from pulse sequences having a desired characteristic ratio. Output pulses thus obtained from the first gate clipper, properly synchronized are then combined with the original incoming signal, to serve as deblocking pulses for pulse series having the desired ratio of width-to-frequency. The deblocked signal pulses obtained in this manner are then demodulated or applied to other utilization circuits.

For a further understanding of the invention, reference may be had to the following detailed description to be read in connection with the accompanying drawings in which:

Fig. 2 is a diagram of a possible circuit which may perform the functions indicated in Fig. 1; and Fig. 3 is a set of graphical illustrations used in explaining the operation of the parts of Figs. 1 and 2.

Figure 1:
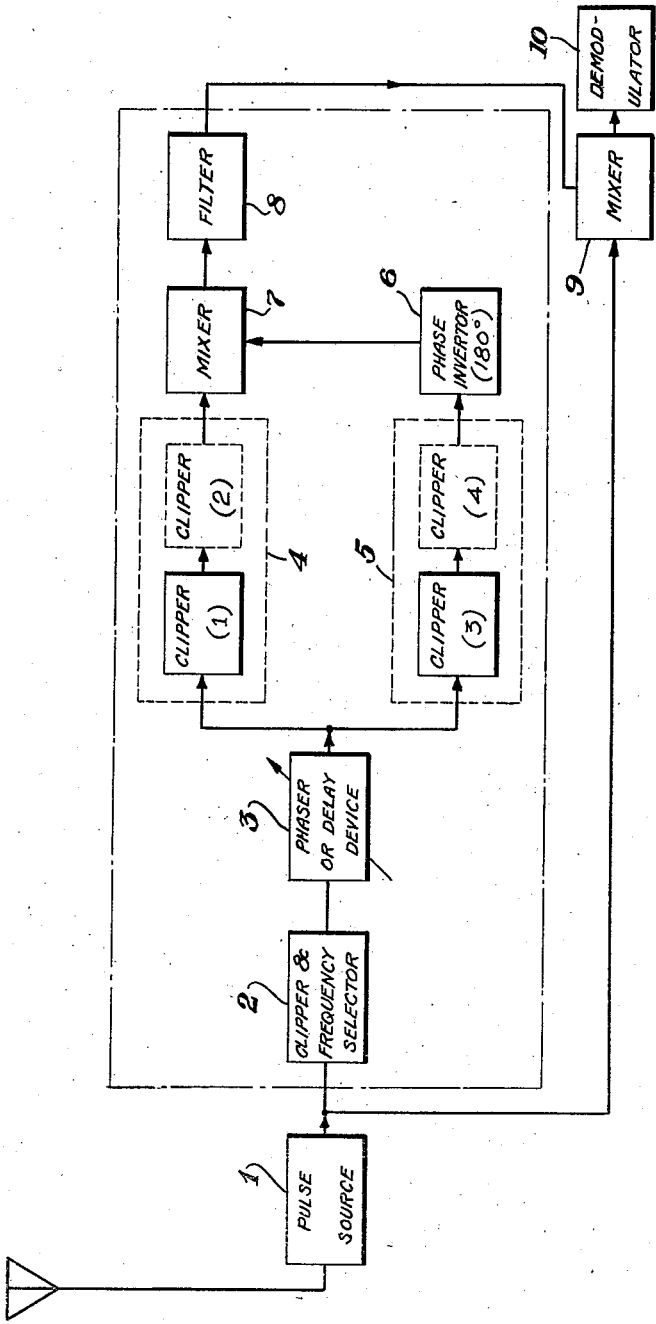
Fig. 1 is a block diagram of an embodiment of our invention.

Referring to Fig. 1, I designates a pulse source which may, for example, be a receiver for time modulated pulse energy, and may supply a train of pulses as shown in curve $a$ of Fig. 3. The pulses shown represent three different ratios of pulse width-to-pulse frequency, as will be apparent from an inspection of the respective widths $W_1$ and $W_2$ and pulse repetition periods $T_1$, $T_2$ and $T_3$.

The pulses are fed into a clipper and tuned frequency selector circuit 2, serving to limit the pulses to a single common amplitude, and to provide a sine wave output having a frequency of the tuned circuit for each of the pulse series, the amplitudes of which are proportional to the respective ratios of pulse width W to pulse periodicity T as regards a selected ratio. The frequency to which the selector circuit is tuned is one having a period equal to the period or an equal division of that of the desired pulse series.

After applying the sine wave outputs to a delaying or phase shifting circuit 3, the function of which will be discussed at a later point, the sine waves are put through gate clipper circuits 4 and 5. The sections of the sine waves which are obtained by clipper 4 are at a level substantially adjacent to but below the sections obtainable through clipper 5. The sine wave sections from clipper 5 are then given a phase inversion in phase inverter circuit 6 and are then combined with the output of the clipper 4 in mixing means 7. In effect, this will result in the substantial elimination of any output from the mixer 7 due to sine waves having amplitudes sufficiently large to produce an output from gate clipper 5. A filter 8 following the mixer 7 is designed to remove high frequency components over and above those required for the proper delineation of the output pulse wave form which may be present in the mixer output due to the combination of the signals from clippers 4 and 5. Any signal thus obtainable from filter 8 is then utilized as a deblocking signal in combination with the original input pulses applied to a mixer circuit 9. The signal obtained in this manner is applied to a demodulator 10 which acts to demodulate to audio the incoming time-modulated pulse signals, the desired ratio of pulse width to pulse cadence of which is now properly distinguished from pulse series having other ratios that may be present.

In order to be able to accurately synchronize the deblocking signal with the desired incoming pulse series, the delay circuit 3, which is adjustable, is employed to shift the phase of the sine wave output of the selector circuit 2 with respect to the original pulse signal.

As an illustration of a specific embodiment of the invention, the circuit of Fig. 2 will now be described:

The incoming pulse train may consist of several different pulse series as exemplified in curve $a$ of Fig. 3 by pulses 14, 15, 16 and 17, the different series differing in pulse widths $W_1$ and $W_2$ and repetition rates indicated by the periods $T_1$, $T_2$, and $T_3$, as shown. For illustrative purposes, $W_2$ has been chosen as being twice that of $W_1$, while $T_2$ is a fraction larger than $T_1$, $T_3$ being equal to twice $T_1$. By means of the screen grid tube 11, the pulses applied thereto through coupling elements 12 and 13, are subjected to a peak limiting action, whereby the amplitudes of the pulses may be reduced to a uniform maximum value indicated by line 19 in curve $3a$. The uniform amplitude pulses coming out of tube 11 are applied to a tunable circuit 21, comprised of a variable capacity C and an inductance L. The circuit 21 which has preferably a high Q, may be tuned to a frequency $F_1$ represented by the period $T_1$ where the pulse series 14 or 16 is desired.

The individual pulse series are each effective in exciting the tuned circuit 21 to produce a sine wave having a frequency $F_1$ and having an amplitude which is proportional to the ratio of pulse width W to the period of recurrence T. Sine waves, such as effected by the pulses of curve $a$ are shown in curve $b$ being designated by $14b$, $15b$, $16b$ and $17b$, respectively. This will be understood when it is recalled that in accordance with the teachings of Fourier's wave analysis, periodic or cyclical voltages or currents having some other shape than a pure sinusoid will have the same total effect in setting up currents or other responses as that obtained by combining the individual responses due to the individual component pure sinusoids, into which the non-sinusoidal voltage may be resolved.

The pulses may be thought of as having been broken down into sinusoidal wave components of various frequencies, only the $F_1$ component of which, however, appears across the tuned circuit because of the highly selective response of the circuit 21 with respect to frequency $F_1$. The sine wave output for any pulse of a given width will be proportional to the magnitude of its respective $F_1$ component, which becomes greater the closer $T_p$, i. e. the pulse periodicity, approaches $T_1$, the period to which the selective circuit is tuned.

The other factor affecting the sine wave output is of course the width W of the pulses. The amplitude of the harmonics of the fundamental pulse frequency bears a functional relationship to the pulse shape characteristics, as is well known by the Fourier teaching. It becomes apparent from the preceding, therefore, that, for a given frequency $F_1$ for the tuned circuit 21, the amplitudes of the sine waves are a function of the ratio of pulse width to pulse periodicity (W/T).

It will be noticed that the sine waves due to pulses 14 and 16 have been shown to have the same amplitude although pulse 16 has double the width of pulse 14. Pulses 14, 15, 16 and 17 are seen to occur with the frequencies $F_1$, $F_2$, $F_3$ (equal to ½ $F_1$) and $F_1$, respectively. Since the output of the circuit 21 will contain substantially only the $F_1$ component, that being its tuned frequency, any variations in the amplitude of the various sine waves will be a function of the ratio of pulse width-to-periodicity, as explained above. The amplitude of the wave $16b$ will therefore be substantially equal to that of $14b$, since the characteristic ratio of width to period for the pulse series 14 and 16, is identical. Assume, however, that the ratio of width $W_1$ to pulse periodicity $T_1$ is the desired ratio, since pulse series 14 and 16 are both of this ratio, the pulses thereof will be segregated from the train of pulses of curve $a$.

It is to be noted that the waves shown in curve $b$ represent a steady state condition attained in the circuit 21 after a period of operation. The sine waveform obtained from the circuit 21, is passed through the phase shifter 3, which is decoupled from the circuit 21 by means of the resistance 20 and may comprise, in addition, as shown in Fig. 2, a capacity 23 and a variable resistor 24 employed for effecting the adjustment in phase, as referred to above.

Sine wave energy from the phase shifter 3 is applied by means of leads 25 and 26 to the gate clipper circuits 4 and 5, respectively. Each of the gate clippers comprises a pair of negatively biased clipper tubes in cascade, the tubes of gate 4 being indicated by references 27 and 28, while those of gate 5 are referred to by 29 and 30, respectively.

The action of the gate clippers is quite conventional and is illustrated in curve $c$, where it is shown applied to the sine wave energy output of the tuned circuit 21. For the purpose of facilitating the explanation of the clipping action, the sine waves at different levels of amplitude have been shown in curve $c$ as being in phase. The gate clipping action of clipper 4 is effective between the levels (1) and (2), while the clipper 5 acts between levels (3) and (4), these effects being achieved by the appropriately adjustable grid biases, as indicated at C—(1), C—(2), C—(3) and C—(4), respectively. It is to be noted that the action of the gate clippers is to be thought of as being effective with respect to each of the sine waves separately since only one pulse series at a time is accepted by the circuit due to the reflex blocking action indicated in the circuit diagram. The width of the respective sine wave sections obtained from the clippers may be varied within given limits by adjusting the bias accordingly. The significance of this ability to adjust the widths of the clipped sections will become apparent at a later point.

From inspection of curve $c$, it will be apparent that the gate clipper 5 will not be productive of any output unless the sine waves applied thereto have an amplitude at least extending above level (3), while clipper 4 is effective only with repect to sine waves extending above the level (1).

The output of clipper 5 is fed to a polarity inversion circuit 6 which may take the form of a conventional amplier tube 31, as shown. The outputs of tubes 28 and 31, as obtained from the same sine wave, are then applied to the control grids of tubes 32 and 33, respectively, of the mixer circuit 7. The tubes 32 and 33, making up the mixer combination, are connected in push-pull input fashion, but with the outputs in parallel, so that their combined output will be the sum of the two input signals.

The combination of the gate clippers 4 and 5, with the inverter 6, and the mixer 7, which individually, of course may take other suitable forms, are thus seen to produce an output only for sine waves having their peaks between levels (1) and (3) of the clipper circuits 4 and 5. This is apparent, since the clippers eliminate any signal below level (1), and the signal resulting from tubes 31 and 28, for any sine wave extending above level (3), will balance out due to inversion by circuit 6 of any output of clipper 5 and its combination with a substantially equal and opposite output from clipper 4.

This is illustarted by curves d to h, where (d) and (e) show the output of clippers 4 and 5 respectively, for an input corresponding to the sine waves 14c and 16c, the resultant at the mixer output terminals being that shown in curve d. In curve f is shown the output pulse due to sine wave 17c of clipper 4 which, when combined with the inverted output of clipper 5, as seen in curve g, results in a high frequency ripple output (curve h). By passing the output of the mixer 7 through the low-pass filter 8, any such high frequency components are eliminated.

A tetrode 34 may perform the function of a mixer for serving to combine the pulse coming from the filter 8 and the original signal by their application to grids 35 and 36 of the tetrode 34 through leads 37 and 38, respectively. By proper adjustment of the phase shifter control 24, device 3, Figs. 1 and 2, the pulse from filter 8 may be made to assume the correct phase relation with respect to the original incoming pulses so that it may properly fulfill its function as a deblocking pulse for the pulse signal of the desired ratio, as indicated in curve i. As regards the pulse train of curve a the system will separate both of the pulse series 14 and 16 as is clearly apparent from waves 14b and 16b of curve b. The clipper circuit 4 is so designed as to provide the deblocking signal with the properly adjustable width for the pulse to assume any position with respect thereto within the time modulation interval indicated by t, (curve i), without impairment of its deblocking function. The clipper 5 is similarly adjustable in order to facilitate the balancing out of its output with that of clipper 4.

The desired incoming signal thus selectively deblocked, is then applied to a demodulator 10, which may be of any known form capable of translating time displacement modulation into amplitude displacements for reproduction of the audio in the usual manner. The bias of the mixer tube 34 may be made such as to apply a threshold clipping operation to the deblocked pulses as indicated at 40.

From the foregoing description, it is clear that any pulse sequence having a given ratio of width to-periodicity may be selectively deblocked for any desired utilization thereof.

While we have discussed our invention in connection with a specific circuit arrangement, it should be distinctly understood that this embodiment of the invention is not intended as a limitation on the scope of the invention as set forth in the objects and in the accompanying claims.

We claim:

1. A system for segregating a pulse series having a given ratio of pulse width to pulse periodicity from a train of mixed pulse series of various ratios of pulse width to pulse periodicity comprising means tunable for producing waves of a selected frequency in response to the pulses of the different series in said train, the period of said waves being equal to or some division of the pulse periodicity of the pulse series having said given ratio and the amplitude of each wave being determined by the pulse width and periodicity of the corresponding pulse series, means for segregating from said waves, portions of the wave resulting from the pulse series of said given ratio, means for mixing said portions with the pulses of said train, and means for clipping the resulting pulse energy when pulses of said train coincide with said wave portions.

2. A system for segregating a pulse series having a given ratio of pulse width to pulse periodicity from a train of mixed pulse series of various ratios of pulse width to pulse periodicity comprising means tunable for producing waves of a selected frequency in response to the pulses of the different series in said train, the period of said waves being equal to or some division of the pulse periodicity of the pulse series having said given ratio and the amplitude of each wave being determined by the pulse width and periodicity of the corresponding pulse series, means including a gate clipping circuit for segregating from said waves, portions of the wave having amplitudes above a given lower level and less than a given upper level; and means for clipping the resulting pulse energy when pulses of said train coincide with said wave portions.

3. A system for segregating a pulse series having a given ratio of pulse width to pulse periodicity from a train of mixed pulse series of various ratios of pulse width to pulse periodicity comprising means tunable for producing waves of a selected frequency in response to the pulses of the different series in said train, the period of said waves being equal to or some division of the pulse periodicity of the pulse series having said given ratio and the amplitude of each wave being determined by the pulse width and periodicity of the corresponding pulse series; first gate clipper means for acting on a relatively lower section of said waves; second gate clipper means for acting on an upper section of said waves; means for combining the outputs for any wave of said first and said second gate clipper means; means to segregate from the output of said two gate means, sections of waves having amplitudes at least within said lower section and less than said upper section; and means for clipping the resulting pulse energy when pulses of said train coincide with said wave portions.

4. A system for segregating a pulse series having a given ratio of pulse width to pulse periodicity from a train of mixed pulse series of various ratios of pulse width to pulse periodicity comprising means tunable for producing waves of a selected frequency in response to the pulses of the different series in said train, the period of said waves being equal to or some division of the pulse periodicity of the pulse series having said given ratio and the amplitude of each wave being determined by the pulse width and periodicity of the corresponding pulse series; first gate clipper means for acting on a relatively lower section of said waves; second gate clipper means for acting on an upper section of said waves; means for inverting in phase the output of said second named clipper means; means for combining the outputs of said first clipper means and said phase inverting means, whereby sections of waves will be segregated due to waves having amplitudes at least within said lower section and less than said upper section; and means for clipping the resulting pulse energy when pulses of said train coincide with said wave portions.

5. The system defined in claim 3, wherein said first named gate means comprises a first level and a second level clipper means for obtaining a lower section of the sine waves, and said second named gate means comprises a third level and a fourth level clipper means for obtaining an upper section of said sine waves.

6. The system defined in claim 4, wherein said phase inverting means comprises an amplifier.

7. The system defined in claim 3, wherein said means for combining comprises a mixer circuit.

8. A system for segregating a pulse series having a given ratio of pulse width to pulse periodicity from a train of mixed pulse series of various ratios of pulse width to pulse periodicity, comprising pulse peak limiter means; tuned frequency circuit means for providing sine waves at the tuned frequency in response to said pulses in operative connection with said first named means; sine wave phase adjustment means; lower section sine wave gate clipping means, upper section sine wave gate clipping means, at least one of said two gate clipping means being connected to receive its input from said phase adjustment means; means for inverting in phase the output of said upper section gate means; means for combining the outputs of said first named gate clipper means and said phase inverting means; low pass filter means for receiving the output of said means for combining; mixing means for combining the signal from said filter means with the signal from said source; and means for clipping the resulting pulse energy.

9. In a system having a resonant circuit for selectively segregating a pulse series having a given ratio of pulse width to pulse periodicity from a train of mixed pulse series of various ratios of pulse width to pulse periodicity, the method comprising tuning said resonant circuit to a frequency the period of which is equal to or some division of the pulse periodicity of a pulse series having said given ratio, the amplitude of each wave being determined by the pulse width and periodicity of the corresponding pulse series, segregating from said waves, portions of the wave resulting from the pulse series of said given ratio, mixing said portions with the pulses of said train to elevate the pulses thereof occurring in coincidence with said portions, and clipping the elevated pulse energy, thereby obtaining pulses of the series having said given ratio.

10. A method of selectivity segregating a pulse series having a given ratio of pulse width to pulse periodicity from a train of mixed pulse series of various ratios of pulse width to pulse periodicity, comprising generating waves of a frequency the period of which is equal to or some division of the pulse periodicity of a pulse series having said given ratio in response to said mixed pulse series, said waves having amplitudes proportional to the respective ratios of pulse width to pulse periodicity, segregating for separating purposes portions of waves having amplitudes above a given lower level and less than a given upper level, and applying the resultant as a deblocking signal to the original train of mixed pulse series.

11. A method of selectively segregating a pulse series having a given ratio of pulse width to pulse periodicity from a train of mixed pulse series of various ratios of pulse width to pulse periodicity, comprising limit clipping the train of pulses to provide constant amplitude for the pulses, shock exciting by means of the pulses a resonant circuit tuned to a frequency the period of which is equal to or some division of the pulse periodicity of a pulse series having said given ratio to provide as a steady state condition a plurality of sine waves at the tuned frequency which are proportional in their amplitudes to the respective ratios of pulse width to pulse periodicity, gate clipping each sine wave at a given level to eliminate the waves having an amplitude less than said given level, gate clipping each sine wave at a higher level than said given level, inverting in phase the result of said higher level gate clipping operation, combining the signal obtained from said first clipping and the phase inverted signal of the higher level gate clipping operation to effect a balancing out of any signal due to waves having an amplitude high enough to be productive of a signal after the higher level gate clipping, filtering out any high frequency components that may result from the balancing out operation, and combining the original pulse train with the product of the filtering operation to thereby selectively deblock the pulse train with respect to those pulses having the desired ratio of pulse width to pulse periodicity.

12. The method defined in claim 11, including the step of adjusting the phase of the deblocking signal with respect to the pulse train for selective deblocking thereof.

13. The method defined in claim 11, wherein the pulses are signal modulated in respect to time, including the step of making the width of the deblocking signal sufficient to accommodate any shift of the signal pulses due to time modulation.

14. A system for segregating pulse series having a given ratio of pulse width to pulse periodicity from a train of mixed pulse series of various ratios of pulse width to pulse periodicity, comprising means for translating the pulses of the different pulse series of said train into waves, the amplitude of each wave being proportional to the relationship of the ratio of the corresponding pulse series with respect to said given ratio, means for obtaining from said waves, pulse portions of the wave resulting from pulse series having said given ratio, and means responsive to said pulse portions for separating from said train pulse series having said given ratio.

15. A system for segregating energy of pulse series having a given ratio of pulse width to pulse periodicity from a train of mixed pulse series of various ratios of pulse width to pulse periodicity, comprising means for translating the pulses of the different pulse series of said train into waves, the amplitude of each wave being proportional to the relationship of the ratio of the corresponding pulse series with respect to said given ratio, and means for obtaining from said waves, pulse portions of the wave or waves resulting from pulse series of said given ratio.

16. A system according to claim 15 further including means for mixing said pulse portions with said train of pulses for segregation of the pulses of those series having said given ratio and means to shift said waves in phase to align said pulse portions with the pulses of those series having said given ratio.

17. A method of selectively segregating pulse series having a given ratio of pulse width to pulse periodicity from a train of mixed pulse series of various ratios of pulse width to pulse periodicity, comprising translating the pulses of each series into a wave, the amplitude of each wave being proportional to the relationship of the ratio of the corresponding pulse series with respect to said given ratio, selecting from the resulting waves, pulse portions thereof corresponding to the pulse series having said given ratio, and applying said pulse portions to the train of mixed pulse series for segregating the pulses of the pulse series having said given ratio.

18. A method of selectively segregating energy of pulse series having a given ratio of pulse width to pulse periodicity from a train of mixed pulse series of various ratios of pulse width to pulse periodicity, comprising translating the pulses of each series into a wave, the amplitude of each wave being proportional to the relationship of the ratio of the corresponding pulse series with respect to said given ratio, obtaining from the resulting waves pulse portions corresponding to the pulse series having said given ratio, and employing said pulse portions for selective segregation.

EMILE LABIN.
DONALD D. GRIEG.